(12) United States Patent
Velankar et al.

(10) Patent No.: US 12,480,070 B2
(45) Date of Patent: Nov. 25, 2025

(54) ODORANTS AND COMPOSITIONS COMPRISING ODORANTS

(71) Applicant: S H KELKAR AND COMPANY LIMITED, Maharashtra (IN)

(72) Inventors: Avdhoot D Velankar, Mumbai (IN); Kedar Ramesh Vaze, Mumbai (IN); Popat D Shinde, Mumbai (IN); Vijay J Kute, Mumbai (IN); Ravindra D Gaikwad, Mumbai (IN); Shrikant B Shirke, Mumbai (IN); Goraksha M Khose, Mumbai (IN); Tanaji J Mengawade, Mumbai (IN); Rasika S Bhide, Mumbai (IN)

(73) Assignee: S H KELKAR AND COMPANY LIMITED (IN)

( * ) Notice: Subject to any disclaimer, the term of this patent is extended or adjusted under 35 U.S.C. 154(b) by 686 days.

(21) Appl. No.: 17/793,872

(22) PCT Filed: Jan. 19, 2021

(86) PCT No.: PCT/IB2021/050381
§ 371 (c)(1),
(2) Date: Jul. 19, 2022

(87) PCT Pub. No.: WO2021/148940
PCT Pub. Date: Jul. 29, 2021

(65) Prior Publication Data
US 2023/0089094 A1    Mar. 23, 2023

(30) Foreign Application Priority Data

Jan. 20, 2020 (IN) .............................. 202021002355
Mar. 2, 2020 (EP) ..................................... 20160453

(51) Int. Cl.
C11B 9/00    (2006.01)
C07D 309/10    (2006.01)
C07D 309/18    (2006.01)

(52) U.S. Cl.
CPC ............ C11B 9/008 (2013.01); C07D 309/10 (2013.01); C07D 309/18 (2013.01)

(58) Field of Classification Search
CPC .. C07D 309/10; C07D 309/18; C07D 309/22; C11B 9/008; C11D 3/0068; C11D 3/50
USPC ...................................................... 512/11, 1
See application file for complete search history.

(56) References Cited

U.S. PATENT DOCUMENTS

2009/0263336 A1* 10/2009 Mane ...................... A61K 8/498
514/460

FOREIGN PATENT DOCUMENTS

EP    3072501 A1    9/2016
WO    2014053744 A1    4/2014

OTHER PUBLICATIONS

European Patent Office; International Search Report and Written Opinion issued in International Application No. PCT/IB2021/050381 dated May 12, 2021; 18 pages.
Rossiter, Karen; "The Design and Synthesis of Novel Muguet Fragrance Ingredients: The Discovery of a Series of 3-Alkylcycloalkanols"; Chimia International Journal for Chemistry, Schweizerische Chemische Gesellschaft, CH; vol. 55, No. 5; Jan. 1, 2001; pp. 388-396, XP001525713; ISSN: 0009-4293.
Markert M. et al; ""LiClO" 4-Activated stereo-and regioselective alkylation of aldehydes"; Tetrahedron, vol. 60, No. 4; Elsevier Science Publishers, Amsterdam, NL; Jan. 19, 2004; pp. 993-999; XP004484647; ISSN: 0040-4020; DOI: 10.1016/J.TET.2003.11.039.

* cited by examiner

Primary Examiner — Jessica Whiteley
(74) Attorney, Agent, or Firm — MASCHOFF BRENNAN

(57) ABSTRACT

The present invention relates to new classes of odorous tetrahydropyran-4-ol derivatives of formula X and/or alkene derivatives thereof of formula Y1 and Y2 which are useful as fragrance or flavor materials in particular in providing camphoraceous, woody, earthy, and/or patchouli-like notes to perfume, aroma or deodorizing/masking compositions. The present invention also relates to fragrance, flavor and/or deodorizing/masking compositions comprising said new classes of odorous tetrahydropyran-4-ol derivatives and/or alkene derivatives thereof.

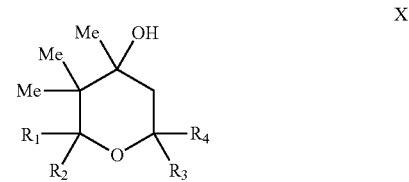
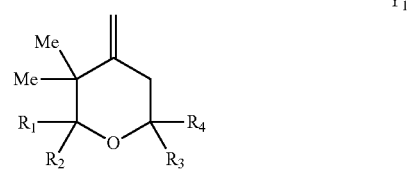
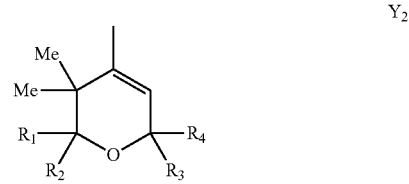

20 Claims, No Drawings

ODORANTS AND COMPOSITIONS COMPRISING ODORANTS

FIELD OF THE INVENTION

The present invention relates to new classes of odorous tetrahydropyran-4-ol derivatives and/or alkene derivatives thereof which are useful as fragrance or flavor materials in particular in providing camphoraceous, woody, earthy, and/or patchouli-like notes to perfume, aroma or deodorizing/masking compositions. The present invention also relates to fragrance, flavor and/or deodorizing/masking compositions comprising said new classes of odorous tetrahydropyran-4-ol derivatives and/or alkene derivatives thereof. The present invention furthermore refers to the said odorants which can be used in the novel fragrance, flavor and/or deodorizing/masking compositions of the present invention. The present invention also refers to a method for the production of the said odorants/compounds and of the corresponding fragrance, flavor and/or deodorizing/masking compositions containing said odorants/compounds.

More particularly, the present invention relates to 2,6-disubstituted-3,3,4-trimethyltetrahydro-2H-pyran-4-ol derivatives (X) and/or 2,6-disubstituted-3,3-dimethyl-4-methylenetetrahydro-2H-pyran derivatives ($Y_1$) and/or 2,6-disubstituted-3,3,4-trimethyl-3,6-dihydro-2H-pyran derivatives ($Y_2$) (odorants) which are useful as fragrance or flavor materials, in particular, in providing camphoraceous, woody, earthy, and/or patchouli-like notes to perfume, aroma or deodorizing/masking compositions.

BACKGROUND OF THE INVENTION

Increasing limitations on the supply of natural fragrance ingredients have revolutionized the field of synthetic fragrance ingredients. Nowadays, there is an increasing demand for novel odorants/compounds and/or novel fragrance, flavor and/or deodorizing/masking compositions comprising said odorants/compounds.

Patchouli oil is a very important natural oil that is widely used in fragrance creation. Patchouli oil is produced by steam distillation of dried and fermented leaves of patchouli shrubs. Patchouli oil presents a woody-balsamic scent and this odor profile has a fine blend of camphoraceous, woody and earthy notes. Although (-)-patchoulol which is present in about 35-40% in patchouli oil has been described as its main odorous principle, its synthesis is extremely challenging. There is an ever increasing demand for easily synthesizable novel compounds which have blends of woody, camphoraceous and earthy notes and which impart patchouli-like odor profile to compositions.

US2009263336 (A1) claims a process of preparing a compound of formula (A),

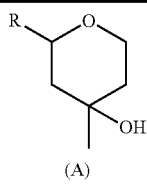

wherein R represents a linear or branched C5 alkyl group, (A)

the process comprising reacting a compound of formula (B) with isoprenol,

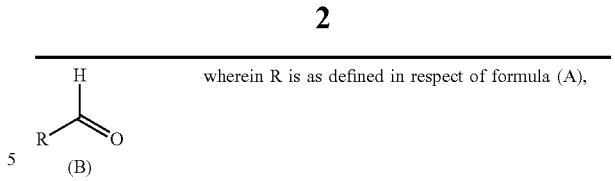

wherein R is as defined in respect of formula (A), (B)

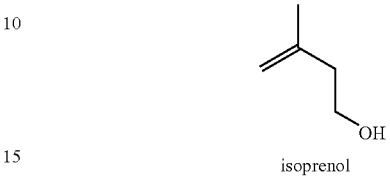

isoprenol in the presence of an acid, the reaction being carried out in an organic solvent selected from the group comprising toluene, xylene, trimethylbenzene, cyclohexane, and methylcyclohexane, at a temperature of about 70° C. to reflux, preferably at 80° C. to 90° C., and even more preferably at about 80° C. The acids are selected preferably from a group comprising of para-toluenesulfonic acid (PTSA), sulfuric acid and other supported acids.

M. Markert, I. Buchem, H. Krüger and R. Mahrwald have published in Tetrahedron [Volume 60, Issue 4, 19 Jan. 2004, Pages 993-999] an article about $LiClO_4$-Activated stereo- and regioselective alkylation of aldehydes.

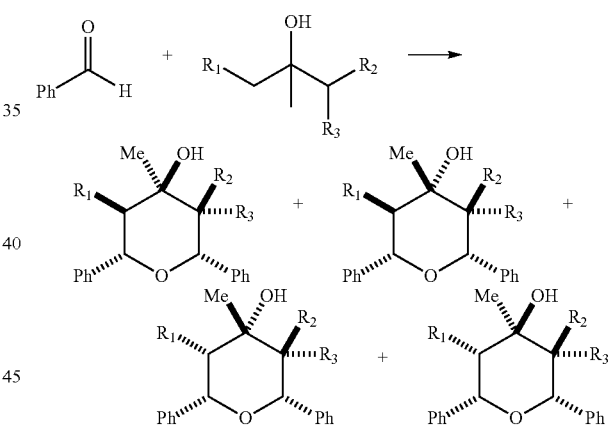

For example, they disclose a scheme in which an aldehyde (benzaldehyde or aliphatic aldehyde) is reacted with an alcohol or the corresponding titanium (IV)-alkoxide, in presence of $LiClO_4$/ethyl p-toluenesulfonate to afford tertiary pyranols. By this methodolgoy, one can synthesize only those pyranols that have same substitution in positions 2 and 6. Further, as mentioned in this article, yields using benzaldehyde are typically higher (yields 46-77%) than those wherein aliphatic aldehydes (yields 26-36%) were used.

2-Alkyl-4-methyltetrahydro-2H-pyran-4-ol derivatives are known to possess floral, muguet aspects. Florosa or 2-Isobutyl-4-methyltetrahydro-2H-pyran-4-ol has rosy and muguet odor. It was reported by Rossiter, K. in Chimia volume 55 (2001) pages 388-396 that introduction of two methyl groups (or dimethylation) in position 5 of the structure of Florosa destroys muguet character. In fact, the cis-isomer of the resulting compound 4,5,5-trimethyl-2-(2-methylpropyl)tetrahydro-2H-pyran-4-ol has sulfurous, rubbery and oily odor while its trans-isomer is odorless.

Surprisingly, we found that along with introduction of two methyl groups (or dimethylation) in position 5 of the tetrahydropyran-4-ol moiety, if an alkyl group is introduced in the position next to the oxygen atom but in the position different from original alkyl group, then the resulting 2,6-dialkyl-3,3,4-trimethyltetrahydro-2H-pyran-4-ol derivatives possess camphoraceous, woody, earthy, patchouli like characteristics.

Only one such 2,6-disubstituted-3,3,4-trimethyl-substituted tetrahydropyranol has been reported. For example, 3,3,4-trimethyl-2,6-diphenyltetrahydro-2H-pyran-4-ol was reported by Markert, M. et al. in Tetrahedron volume 60, year 2004, pages 993-999, wherein this compound was prepared as a mixture of diastereomers (83:17) by a reaction between benzaldehyde and tetrakis((2,3-dimethylbutan-2-yl)oxy)titanium in presence of lithium perchlorate. However, no fragrance, flavor and/or deodorizing/masking compositions are disclosed in this article and there is absolutely no evidence nor any suggestion of the existence of any olfactive property associated with 3,3,4-trimethyl-2,6-diphenyltetrahydro-2H-pyran-4-ol.

There are no reported substances that are similar to 2,6-disubstituted-3,3-dimethyl-4-methylenetetrahydro-2H-pyran derivatives ($Y_1$). There are no reports that provide any evidence or any suggestion of the existence of any olfactive property associated with 2,6-disubstituted-3,3-dimethyl-4-methylenetetrahydro-2H-pyran derivatives ($Y_1$).

Similarly, there are no reported substances that are similar to 2,6-disubstituted-3,3,4-trimethyl-3,6-dihydro-2H-pyran derivatives ($Y_2$). There are no reports that provide any evidence or any suggestion of the existence of any olfactive property associated with 2,6-disubstituted-3,3,4-trimethyl-3,6-dihydro-2H-pyran derivatives ($Y_2$).

SUMMARY OF THE INVENTION

This invention discloses novel fragrance, flavor and/or deodorizing/masking compositions comprising 2,6-disubstituted-3,3,4-trimethyltetrahydro-2H-pyran-4-ol derivatives selected from compounds of formula (X) and/or 2,6-disubstituted-3,3-dimethyl-4-methylenetetrahydro-2H-pyran derivatives selected from compounds of formula ($Y_1$) and/or 2,6-disubstituted-3,3,4-trimethyl-3,6-dihydro-2H-pyran derivatives selected from compounds of formula ($Y_2$) wherein formulae (X), ($Y_1$), and ($Y_2$) are

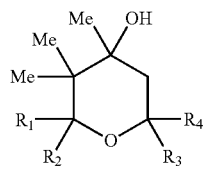

X

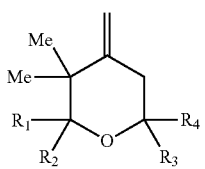

$Y_1$

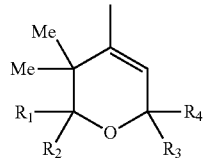

$Y_2$ wherein $R_1$ is an alkyl group having up to 6 carbon atoms or an alkenyl group having up to 6 carbon atoms or a phenyl group or a substituted phenyl group; $R_2$ is H or an alkyl group having up to 6 carbon atoms or an alkenyl group having up to 6 carbon atoms; $R_3$ is an alkyl group having up to 6 carbon atoms or an alkenyl group having up to 6 carbon atoms or a phenyl group or a substituted phenyl group and $R_4$ is H or an alkyl group having up to 6 carbon atoms or an alkenyl group having up to 6 carbon atoms, with the proviso that (X) can't be 3,3,4-trimethyl-2,6-diphenyltetrahydro-2H-pyran-4-ol.

Thus, according to the present invention, (X) can't be 3,3,4-trimethyl-2,6-diphenyltetrahydro-2H-pyran-4-ol.

In an embodiment according to the present invention, $R_1$ is an alkyl group having up to 6 carbon atoms or an alkenyl group having up to 6 carbon atoms; $R_2$ is H or an alkyl group having up to 6 carbon atoms or an alkenyl group having up to 6 carbon atoms; $R_3$ is an alkyl group having up to 6 carbon atoms or an alkenyl group having up to 6 carbon atoms and $R_4$ is H or an alkyl group having up to 6 carbon atoms or an alkenyl group having up to 6 carbon atoms.

According to the present invention, radicals $R_1$ and $R_2$ are separated radicals, i.e. they do not form together a ring. According to the present invention, radicals $R_3$ and $R_4$ are separated radicals, i.e. they do not form together a ring.

In an embodiment according to the present invention, $R_1$ is methyl, ethyl, n-propyl, i-propyl, n-butyl, s-butyl, t-butyl, i-butyl, n-pentyl, 2-pentyl, 3-pentyl, n-hexyl, 2-hexyl, 3-hexyl, vinyl, 1-propenyl, prop-1-en-2-yl, allyl, 1-butenyl, 2-butenyl, but-3-en-2-yl, 1-pentenyl, pent-2-en-1-yl, pent-3-en-1-yl, pent-4-en-1-yl, pent-1-en-2-yl, 2-pentenyl, pent-3-en-2-yl, pent-4-en-2-yl, pent-2-en-3-yl, pent-1-en-3-yl, 1-hexenyl, hex-2-en-1-yl, hex-3-en-1-yl, hex-4-en-1-yl, hex-5-en-1-yl, hex-1-en-2-yl, 2-hexenyl, hex-3-en-2-yl, hex-4-en-2-yl, hex-5-en-2-yl, 3-hexenyl, hex-1-en-3-yl, hex-2-en-3-yl, hex-3-en-3-yl, hex-4-en-3-yl, or hex-5-en-3-yl, a phenyl group or a substituted phenyl group.

In an embodiment according to the present invention, $R_2$ is H, methyl, ethyl, n-propyl, i-propyl, n-butyl, s-butyl, t-butyl, i-butyl, n-pentyl, 2-pentyl, 3-pentyl, n-hexyl, 2-hexyl, 3-hexyl, vinyl, 1-propenyl, prop-1-en-2-yl, allyl, 1-butenyl, 2-butenyl, but-3-en-2-yl, 1-pentenyl, pent-2-en-1-yl, pent-3-en-1-yl, pent-4-en-1-yl, pent-1-en-2-yl, 2-pentenyl, pent-3-en-2-yl, pent-4-en-2-yl, pent-2-en-3-yl, pent-1-en-3-yl, 1-hexenyl, hex-2-en-1-yl, hex-3-en-1-yl, hex-4-en-1-yl, hex-5-en-1-yl, hex-1-en-2-yl, 2-hexenyl, hex-3-en-2-yl, hex-4-en-2-yl, hex-5-en-2-yl, 3-hexenyl, hex-1-en-3-yl, hex-2-en-3-yl, hex-3-en-3-yl, hex-4-en-3-yl, or hex-5-en-3-yl.

In an embodiment according to the present invention, $R_3$ is methyl, ethyl, n-propyl, i-propyl, n-butyl, s-butyl, t-butyl, i-butyl, n-pentyl, 2-pentyl, 3-pentyl, n-hexyl, 2-hexyl, 3-hexyl, vinyl, 1-propenyl, prop-1-en-2-yl, allyl, 1-butenyl, 2-butenyl, but-3-en-2-yl, 1-pentenyl, pent-2-en-1-yl, pent-3-en-1-yl, pent-4-en-1-yl, pent-1-en-2-yl, 2-pentenyl, pent-3-en-2-yl, pent-4-en-2-yl, pent-2-en-3-yl, pent-1-en-3-yl, 1-hexenyl, hex-2-en-1-yl, hex-3-en-1-yl, hex-4-en-1-yl, hex-5-en-1-yl, hex-1-en-2-yl, 2-hexenyl, hex-3-en-2-yl, hex-4-en-2-yl, hex-5-en-2-yl, 3-hexenyl, hex-1-en-3-yl, hex-2-en-3-yl, hex-3-en-3-yl, hex-4-en-3-yl, or hex-5-en-3-yl, a phenyl group or a substituted phenyl group.

In an embodiment according to the present invention, $R_4$ is H, methyl, ethyl, n-propyl, i-propyl, n-butyl, s-butyl, t-butyl, i-butyl, n-pentyl, 2-pentyl, 3-pentyl, n-hexyl, 2-hexyl, 3-hexyl, vinyl, 1-propenyl, prop-1-en-2-yl, allyl, 1-butenyl, 2-butenyl, but-3-en-2-yl, 1-pentenyl, pent-2-en-1-yl, pent-3-en-1-yl, pent-4-en-1-yl, pent-1-en-2-yl, 2-pentenyl, pent-3-en-2-yl, pent-4-en-2-yl, pent-2-en-3-yl, pent-1-en-3-yl, 1-hexenyl, hex-2-en-1-yl, hex-3-en-1-yl, hex-4-en-1-yl, hex-5-en-1-yl, hex-1-en-2-yl, 2-hexenyl, hex-3-en-2-yl, hex-4-en-2-yl, hex-5-en-2-yl, 3-hexenyl, hex-1-en-3-yl, hex-2-en-3-yl, hex-3-en-3-yl, hex-4-en-3-yl, or hex-5-en-3-yl In another embodiment, compounds of formula (X) of this invention can be chiral, e.g. they can be used as stereoisomeric (enantiomeric or diastereomeric) mixtures, more specifically as mixture of enantiomers; RRR isomer, SSS isomer, RSR isomer, SRS isomer, SSR isomer, RRS isomer, SRR isomer, RSS isomer, a racemic mixture and/or a non-racemic mixture of RRR, SSS, RSR, SRS, SSR, RRS, RSS, SRR isomers can also be advantageously used. In another embodiment, compounds of formula $(Y_1)$ or $(Y_2)$ of this invention can be chiral, e.g. they can be used as stereoisomeric (enantiomeric or diastereomeric) mixtures, more specifically as mixture of enantiomers; RR isomer, SS isomer, RS isomer, SR isomer, a racemic mixture and/or a non-racemic mixture of RR, SS, RS, SR isomers can also be advantageously used. In another embodiment, the alcohol compounds of formula (X) and/or alkenes of formula $(Y_1)$ and/or $(Y_2)$ can also be advantageously used in pure form.

A condensed structure (Y) can advantageously be used for depicting both types of compounds 2,6-disubstituted-3,3-dimethyl-4-methylenetetrahydro-2H-pyran derivatives $(Y_1)$ and 2,6-disubstituted-3,3,4-trimethyl-3,6-dihydro-2H-pyran derivatives $(Y_2)$; radicals $R_1$, $R_2$, $R_3$ and $R_4$ being as hereinabove defined.

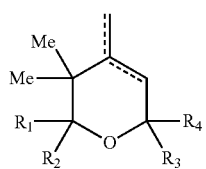

Y

DETAILED DESCRIPTION

The term "odorant" characterizing the compounds according to the present invention means that in humans it triggers an odor sensation which is preferably pleasant; it is therefore conventionally used for perfuming industrial and sanitary articles, washing agents, cleaning agents, personal hygiene products, cosmetics and the like. For the purposes of the present invention and appended claims, the term "odorant" includes "aroma substances". Aroma substances is the term usually used to designate substances which provide odor and/or flavor to foodstuffs.

The alcohol compounds of formula (X) and/or alkenes of formula $(Y_1)$ and/or $(Y_2)$ may be used alone, as mixtures thereof, or in combination with a base material.

As used herein, the "base material" includes all known fragrance/flavor materials selected from the extensive range of natural products like: essential oils, extracts, resinoids or isolates and synthetic materials currently available, such as: hydrocarbons, alcohols, aldehydes and ketones, ethers and acetals, esters and lactones, nitriles, oximes or heterocycles, and/or in admixture with one or more ingredients or excipients/adjuvants conventionally used in conjunction with odorants in fragrance and/or flavor compositions, for example: solvents/diluents, stabilizers, carrier materials, and other auxiliary agents commonly used in the art.

The alcohol compounds of formula (X) and/or alkenes of formula $(Y_1)$ and/or $(Y_2)$ may be used in a broad range of fragrance applications, e.g. in any field of fine and functional perfumery, such as perfumes, air care products, household products, laundry products, body care products and cosmetics. The compounds can be employed in widely varying amounts, depending upon the specific application and on the nature and quantity of other odorant ingredients.

According to a preferred embodiment of the invention, the fragrance, flavor and/or deodorizing/masking composition according to the present invention contains at least one alcohol compound according to formula (X) and/or alkenes of formula $(Y_1)$ and/or $(Y_2)$ as previously described, in quantities between 0.00001 and 99.9 wt. %, for example between 0.0001 and 95 wt. %, for example between 0.001 and 25 wt. %, preferably between 0.01 and 15 wt. %, more advantageously between 0.1 and 10 wt. %, in particular between 1 and 5 wt. %, in each case relative to the entire composition.

According to a particularly preferred embodiment of the invention, in addition to the alcohol compound according to formula (X) and/or alkenes of formula $(Y_1)$ and/or $(Y_2)$ according to the present invention, the fragrance, flavor and/or deodorizing/masking composition according to the present invention contains additional odorants, for example in a quantity of 0.1 to 99.9 wt. %, preferably 5-90 wt. %, in particular 15-70 wt. %, relative to the entire fragrance and/or flavor composition.

The alcohols of formula (X) and/or alkenes of formula $(Y_1)$ and/or $(Y_2)$ as described hereinabove may be employed in a consumer product base simply by directly mixing at least one compound of formula (X) and/or at least one compound of formula $(Y_1)$ and/or at least one compound of formula $(Y_2)$, or a fragrance composition comprising said compound or compounds of formula (X) and/or $(Y_1)$ and/or $(Y_2)$ with the consumer product base; or they may, in an earlier step, be entrapped with an entrapment material, for example, polymers, capsules, microcapsules and/or nanocapsules, liposomes, film formers, absorbents such as active carbon or zeolites, cyclic oligosaccharides, cyclic glycourils, and mixtures of two or more thereof, or they may be chemically bonded to substrates, which are adapted to release the fragrance molecule upon application of an external stimulus such as light, enzyme, air, water or the like, and then mixed with the consumer product base.

Thus, the invention can be useful for existing methods of manufacturing a fragrance, flavor and/or deodorizing/masking composition, comprising the incorporation of one or more compounds of formula (X) and/or $(Y_1)$ and/or $(Y_2)$, as a fragrance, flavor and/or deodorizing/masking ingredient, either by directly admixing the compound to the consumer product base or by admixing a fragrance, flavor and/or deodorizing/masking composition comprising said one or more compounds of formula (X) and/or $(Y_1)$ and/or $(Y_2)$, which may then be mixed with a consumer product base, using conventional techniques and methods. Through the addition of an olfactory-acceptable amount of at least one compound of formula (X) and/or (Y$_1$) and/or (Y$_2$), of the present invention as hereinabove described, the odor notes of a consumer product base can be improved, enhanced, and/or modified.

The present invention discloses novel fragrance, flavor and/or deodorizing/masking compositions comprising 2,6-disubstituted-3,3,4-trimethyltetrahydro-2H-pyran-4-ol derivatives as defined hereinabove and/or 2,6-disubstituted-3,3-dimethyl-4-methylenetetrahydro-2H-pyran derivatives as defined hereinabove and/or 2,6-disubstituted-3,3,4-trimethyl-3,6-dihydro-2H-pyran derivatives as defined hereinabove.

In a particular embodiment according to the present invention, the compounds of formulae (X) and/or (Y$_1$) and/or (Y$_2$) as defined hereinabove are claimed; said compounds being useful in the perfume, aroma and/or deodorizing/masking compositions of the present invention.

In an embodiment, a compound of formula (X) useful in a fragrance, flavor and/or decolorizing/masking composition is selected from the following compounds:
1) 2,6-Diethyl-3,3,4-trimethyltetrahydro-2H-pyran-4-ol
2) 2,3,3,4,6-Pentamethyltetrahydro-2H-pyran-4-ol
3) 2-isopropyl-3,3,4,6-tetramethyltetrahydro-2H-pyran-4-ol
4) 6-ethyl-2-isopropyl-3,3,4-trimethyltetrahydro-2H-pyran-4-ol
5) 6-Ethyl-2,3,3,4-tetramethyltetrahydro-2H-pyran-4-ol
6) 2,3,3,4-Tetramethyl-6-propyltetrahydro-2H-pyran-4-ol
7) 6-Isopropyl-2,3,3,4-tetramethyltetrahydro-2H-pyran-4-ol
8) 2-Ethyl-2,4,5,5,6-pentamethyltetrahydro-2H-pyran-4-ol
9) 2-Ethyl-3,3,4,6-tetramethyltetrahydro-2H-pyran-4-ol
10) 2-Ethyl-3,3,4-trimethyl-6-propyltetrahydro-2H-pyran-4-ol
11) 2-Ethyl-6-isopropyl-3,3,4-trimethyltetrahydro-2H-pyran-4-ol
12) 2-Ethyl-6-isobutyl-3,3,4-trimethyltetrahydro-2H-pyran-4-ol
13) 6-Ethyl-2,2,4,5,5-pentamethyltetrahydro-2H-pyran-4-ol
14) 2,6-Diethyl-2,4,5,5-tetramethyltetrahydro-2H-pyran-4-ol
15) 6-Ethyl-3,3,4-trimethyl-2-propyltetrahydro-2H-pyran-4-ol
16) 6-Isopropyl-3,3,4-trimethyl-2-propyltetrahydro-2H-pyran-4-ol
17) 6-Ethyl-2-isobutyl-3,3,4-trimethyltetrahydro-2H-pyran-4-ol
18) 2-(2,3-Dimethylbut-3-en-2-yl)-2,4,5,5,6-pentamethyltetrahydro-2H-pyran-4-ol
19) 2-(2,3-Dimethylbut-3-en-2-yl)-2-ethyl-4,5,5,6-tetramethyltetrahydro-2H-pyran-4-ol In an embodiment, a compound of formula (Y) useful in a fragrance, flavor and/or decolorizing/masking composition is selected from the following compounds:
20) 2,3,3-Trimethyl-4-methylene-6-propyltetrahydro-2H-pyran or 2,3,3,4-tetramethyl-6-propyl-3,6-dihydro-2H-pyran, or preferably a mixture thereof,
21) 6-ethyl-2,3,3-trimethyl-4-methylenetetrahydro-2H-pyran and 6-ethyl-2,3,3,4-tetramethyl-3,6-dihydro-2H-pyran, or preferably a mixture thereof,
22) 2,3,3,6-tetramethyl-4-methylenetetrahydro-2H-pyran and 2,3,3,4,6-pentamethyl-3,6-dihydro-2H-pyran, or preferably a mixture thereof,
23) 6-Isopropyl-2,3,3-trimethyl-4-methylenetetrahydro-2H-pyran or 6-isopropyl-2,3,3,4-tetramethyl-3,6-dihydro-2H-pyran, or preferably a mixture thereof,
24) 6-Isobutyl-2,3,3-trimethyl-4-methylenetetrahydro-2H-pyran or 6-isobutyl-2,3,3,4-tetramethyl-3,6-dihydro-2H-pyran, or preferably a mixture thereof,
25) 6-Butyl-2,3,3-trimethyl-4-methylenetetrahydro-2H-pyran or 6-butyl-2,3,3,4-tetramethyl-3,6-dihydro-2H-pyran, or preferably a mixture thereof,
26) 2-Ethyl-3,3,6-trimethyl-4-methylenetetrahydro-2H-pyran or 2-ethyl-3,3,4,6-tetramethyl-3,6-dihydro-2H-pyran, or preferably a mixture thereof,
27) 2,6-Diethyl-3,3-dimethyl-4-methylenetetrahydro-2H-pyran or 2,6-diethyl-3,3,4-trimethyl-3,6-dihydro-2H-pyran, or preferably a mixture thereof,
28) 2-Ethyl-3,3-dimethyl-4-methylene-6-propyltetrahydro-2H-pyran or 2-ethyl-3,3,4-trimethyl-6-propyl-3,6-dihydro-2H-pyran, or preferably a mixture thereof,
29) 6-Butyl-2-ethyl-3,3-dimethyl-4-methylenetetrahydro-2H-pyran or 6-butyl-2-ethyl-3,3,4-trimethyl-3,6-dihydro-2H-pyran, or preferably a mixture thereof,
30) 6-Ethyl-3,3-dimethyl-4-methylene-2-propyltetrahydro-2H-pyran or 6-ethyl-3,3,4-trimethyl-2-propyl-3,6-dihydro-2H-pyran, or preferably a mixture thereof,
31) 2-Ethyl-6-(4-methoxyphenyl)-3,3-dimethyl-4-methylenetetrahydro-2H-pyran or 2-ethyl-6-(4-methoxyphenyl)-3,3,4-trimethyl-3,6-dihydro-2H-pyran, or preferably a mixture thereof, In an embodiment according to the present invention, the fragrance, flavor and/or deodorizing/masking composition comprises a compound of formula (X) or of formula (Y) which is selected from any of the compounds and/or from a mixture of two or more of the said compounds given above.

The applicants have surprisingly discovered that from an olfactory perspective, the compounds of formula (X) and (Y) have patchouli-like odor. In fact, compounds (X) and (Y) present a balanced blend of fresh camphoraceous as well as earthy and woody notes. The compounds (X) and (Y) are very retentive on a blotter and very highly diffusive. Indeed, the compounds (X) and (Y) perform extremely well in woody, fougere and floral fragrances. These compounds blend very well with other woody and musky notes.

In an embodiment of the present invention, the claimed fragrance, flavor and/or deodorizing/masking composition is advantageously used as a perfumery composition. Perfumery compositions according to the present invention generally include a perfume, a cologne, an eau du toilette, and/or an eau de parfum. In an embodiment of the present invention, the claimed fragrance, flavor and/or deodorizing/masking composition is advantageously used in a cosmetic formulation, a personal care product, a cleansing product, a fabric softener, and/or air freshener, and the like. Furthermore, it is within the purview of embodiments of the invention that the novel fragrance, flavor and/or deodorizing/masking composition(s) and/or novel compound(s) of formula (X) or of formula (Y) described herein may be integrated into building materials, wall and floor coverings, vehicle components, and the like.

In general, in addition to the novel odorant and/or fragrance, flavor and/or deodorizing/masking compositions described herein, suitable fragrance, flavor or deodorizing compositions may advantageously include conventional ingredients such as, for example, solvents, carriers, stabilizers, emulsifiers, moisturizers, dispersants, diluents, thickeners, thinners, other odorants, and/or adjuvants, and the like.

The compounds of formula (X) or of formula (Y) combine with numerous known natural or synthetic fragrance, flavor and/or deodorizing/masking materials, whereby the range of the natural ingredients can embrace not only readily-volatile but also semi-volatile and slightly-volatile components and the range of the synthetic ingredients can embrace representatives from many classes of substances, such as described in Steffen Arctander, Perfume and Flavor Chemicals, vol.1&2, Montclair, N. J., 1969; Steffen Arctander, Perfume and Flavor Materials of Natural Origin, Elizabeth, N. J., 1960 or Horst Surburg, Johannes Panten, Common Fragrance and Flavor Materials, Wiley-VCH, Weinheim, 2016 and as will be evident from the following nonlimitting compilation:

Natural products such as:

Ajowan oil, Amyris oil, Armoise oil, Artemisia oil, Basil oil, Bees wax absolute, Bergamot oil, Birch tar oil, Black pepper oil, Black pepper oleoresin, Camphor oil, Cananga oil, Caraway oil, Cardamom oil, Carrot seed oil, Castoreum absolute, Cedar leaf oil, Cedarwood oil, Celery seed oil, Chamomile oil, Cinnamon bark oil, Cinnamon leaf oil, Cistus absolute, Cistus oil, Citronella oil, Citronella terpenes, Clary sage oil, Clove oil rectified, Cognac oil white, Coriander seed oil, Cumin seed oil, Cypress oil, Davana oil, Dill seed oil, Elemi oil, Elemi resinoid, Eucalyptus oil, Fir needle oil, Galbanum oil, Geranium oil, Ginger oil Indian, Grapefruit oil, Guaiacwood oil, Gurjun balsam, Jasmin absolute, Jatamansi oil, Juniper berry oil, Juniper leaf oil, Kachur oil, Labdanum absolute, Labdanum resinoid, Lavender oil, Lemon oil, Lemon oil terpenes, Lemongrass oil, Lime oil, Litsea cubeba oil, Litsea cubeba terpenes, Lobhan choya resinoid, Mandarin oil, Mentha arvenis oil, Mentha citrata oil, Mimosa absolute, Myrrh resinoid, Nagarmotha oil, Nutmeg oil, Oakmoss absolute, Oakmoss resinoid, Olibanum oil, Olibanum resinoid, Orange oil, Origanum oil, Palma rosa oil, Patchouli oil, Peppermint oil, Peru Balsam resinoid, Petitgrain oil, Pine needle oil, Pink pepper oil, Rose absolut, Rose oil, Rosemary oil, Sandalwood oil, Seaweed absolute, Spearmint oil, Sugandh kokila oil, Sugandh mantri oil, Tagete oil, Tolu Balsam resinoid, Tuberose absolute, Turmeric oil, Turpentine oil, Valerian oil, Vetiver oil, Vetiver terpenes.

Synthetic raw materials for instance:

Esters such as: Aldehyde C16, Allyl amyl glycolate, Allyl caproate, Allyl cyclohexyl propionate, Allyl heptoate, Allyl phenoxy acetate, Amyl acetate iso, Amyl benzoate, Amyl butyrate, Amyl caproate, Amyl cinnamate, Amyl isovalerate, Amyl phenyl acetate, Amyl propionate, Amyl salicylate iso, Amyris acetate, Anisyl acetate, Benzyl acetate, Benzyl benzoate, Benzyl butyrate, Benzyl cinnamate, Benzyl formate, Benzyl isobutyrate, Benzyl isoeugenol, Benzyl propionate, Benzyl salicylate, Benzyl tiglate, Butyl acetate, Butyl butyrate, Butyl butyryl lactate, Caryophyllene acetate, Cedryl acetate, Cinnamyl acetate, Cinnamyl butyrate, Cis-3-hexenyl acetate, Cis-3-hexenyl benzoate, Cis-3-hexenyl caproate, Cis-3-hexenyl formate, Cis-3-hexenyl isobutyrate, Cis-3-hexenyl-2-methyl butyrate, Cis-3-hexenyl propionate, Cis-3-hexenyl salicylate, Cis-3-hexenyl tiglate, Citronellyl acetate, Citronellyl butyrate, Citronellyl formate, Citronellyl isobutyrate, Citronellyl propionate, Citronellyl tiglate, Cyclabute, Cyclogalbanate, Cyclohexyl ethyl acetate, Decyl acetate, Dibutyl phthalate, Diethyl malonate, Diethyl phthalate, Dihydromyrcenyl acetate, Dimethyl octanyl acetate, Dimethyl phenyl ethyl carbinyl acetate, Dioctyl adipate, Dioctyl phthalate, Dimethyl benzyl carbinyl acetate, Dimethyl benzyl carbinyl butyrate, Ethyl linalyl acetate, Ethyl 2-methyl butyrate, Ethyl 3-phenyl propionate, Ethyl acetate, Ethyl acetoacetate, Ethyl benzoate, Ethyl butyrate, Ethyl caprate, Ethyl caproate, Ethyl caprylate, Ethyl cinnamate, Ethyl heptoate, Ethyl hexyl acetate, Ethyl isobutyrate, Ethyl laurate, Ethyl pelargonate, Ethyl phenoxy acetate, Ethyl phenyl acetate, Ethyl phenyl glycidate, Ethyl propionate, Ethyl safranate, Ethyl salicylate, Ethyl valerate, Eugenyl acetate, Evernyl, Fenchyl acetate, Floramat, Frescolat ML, Fructone, Fruitate, Geranyl acetate, Geranyl butyrate, Geranyl formate, Geranyl propionate, Geranyl tiglate, Givescone, Guaiol acetate, Hedionate, Hedione, Helvetolide, Herbanate, Hexyl acetate, Hexyl benzoate, n-Hexyl butyrate, Hexyl caproate, Hexyl isobutyrate, Hexyl propionate, Hexyl salicylate, Isobornyl acetate, Isobutyl acetate, Isobutyl phenyl acetate, Isobutyl salicylate, Isoeugenyl acetate, Isononyl acetate, Isopentyrate, Isopropyl 2-methyl butyrate, Isopropyl myristate, Jasmonyl, Liffarome, Linalyl acetate, Mahagonate, Manzanate, Menthanyl acetate, Menthyl acetate, Methyl benzoate, 2-Methyl butyl acetate, Methyl camomille, Methyl cinnamate, Methyl cyclogeranate, Methyl heptine carbonate, Methyl laurate, Methyl octine carbonate, Methyl phenyl acetate, Methyl salicylate, Methyl-2-methyl butyrate, Neofolione, Nopyl acetate, Octenyl acetate, Octyl acetate, Octyl isobutyrate, Para cresyl acetate, Para cresyl isobutyrate, Para cresyl phenyl acetate, Pear ester, Peranat, Phenoxy ethyl isobutyrate, Phenyl ethyl acetate, Phenyl ethyl butyrate, Phenyl ethyl formate, Phenyl ethyl isobutyrate, Phenyl ethyl phenyl acetate, Phenyl ethyl propionate, Phenyl ethyl salicylate, Phenyl ethyl tiglate, Phenyl propyl isobutyrate, Prenyl acetate, Romandolide, Sagecete, Styrallyl acetate, Styrallyl propionate, Tangerinol, Terpinyl acetate, Thesaron, Trans-2-hexenyl acetate, Tropicate, Verdox, Verdyl acetate, Verdyl propionate, Vertenex, Vetikol acetate, Vetiveryl acetate, Yasmolys.

Lactones such as: Ambrettolide, Arova N, Celeriax, Decalactone delta, Decalactone gamma, Dodecalactone delta, Dodecalactone gamma, Ethylene brassylate, Exaltolide, Heptalactone gamma, Hexalactone delta, Hexalactone gamma, Methyl laitone, Methyl octalactone, Nonalactone delta, Nonalactone gamma, Octahydrocoumarine, Octalactone delta, Octalactone gamma, Rootylone, Silvanone supra, Undecalactone delta, Undecalactone gamma, Valerolactone gamma, 10-OxaHexaDecanolide (OHD musk), Coumarin, Habanolide, Jasmolactone.

Aldehydes such as: Acetaldehyde, Adoxal, Aldehyde C10, Aldehyde C11 iso, Aldehyde C11 moa, Aldehyde C11 undecylenic, Aldehyde C11 undecylic, Aldehyde C12 lauric, Aldehyde C12 MNA, Anisaldehyde, Amyl cinnamaldehyde, Benzaldehyde, Bourgeonal, Campholenaldehyde, Cantonal, Cetonal, Cinnamic aldehyde, Cis-4-decenal, Cis-6-nonenal, Citral, Citronellal, Citronellyl oxyacetaldehyde, Cocal, Cuminaldehyde, Curgix, Cyclal C, Cyclamen aldehyde, Cyclomyral, Cyclovertal, Decenal 9, Dupical, Empetal, Ethyl vanillin, Floralozone, Florhydral, Geraldehyde, Helional, Heliotropin, Heptanal, Hexanal, Hexyl cinnamaldehyde, Hivernal neo, Hydratropaldehyde, Hydroxycitronellal, Intreleven aldehyde, Isobutavan, Isocyclocitral, Isovaleraldehyde, Lilial, Limonenal, Maceal, Mefranal, Melonal, Methyl cinnamaldehyde, Nonadien-al trans-2 cis-6, Nonanal, Octanal, Oncidal, Para tolyl aldehyde, Phenyl acetaldehyde, Phenyl propyl aldehyde, Precyclemone B, Safranal, Salicylaldehyde, Scentenal, Syringa aldehyde, Trans-4-decenal, Trans-2-dodecenal, Trans-2-hexenal, Trans-2-nonenal, Trifernal, Vanillin, Veratraldehyde, Vernaldehyde Ketones such as: Acetanisol, Acetoin, Acetophenone, Aldron, Allyl ionone, Benzophenone, Benzyl acetone, Calone, Camphor, Carvone d-, Carvone l-, Cashmeran, Cedryl methyl ketone, Cepionate, Claritone, Cosmone, Crysolide, Cyclotene, Damascenone, Damascone alpha, Damascone beta, Damascone delta, Damascone gamma, Diacetyl, Dihydro beta ionone, Dihydro isojasmonate, Dimethyl octenone, Dynascone, Ethyl amyl ketone, Ethyl maltol, Fenchone, Filbertone, Geranyl acetone, Globanone, Heptyl cyclopentanone, Ionone alpha, Ionone beta, Ionone pure, Iriswood, Irone alpha, Iso E Super, Isofenchone, Isojasmone T, Isolone K, Isomenthone, Isophorone, Jasmone cis-, Kambernoir, Kephalis, Koavone, Lavendinal, Maltol, Menthone, Methyl acetophenone, Methyl amyl ketone, Methyl heptenone, Methyl hexyl ketone, Methyl ionone gamma, Methyl naphthyl ketone beta, Methyl nonyl ketone, Muscenone, Muscone, Nectaryl, Orinox, OTBC Ketone, Para tertbutylcyclohexanone, Patchwood, Phantolid, Pharaone, Piperitone, Plicatone, Raspberry ketone, Raspberry ketone methyl ether, Safraleine, Spirogalbanone pure, Tonalid, Trimofix O, Veloutone, Vetikon.

Alcohols such as: Alcohol oxo C13, Amber core, Ambermax, Ambrinol, Amyl vinyl carbinol, Anisic alcohol, Bacdanol, Benzyl alcohol, Butanol, Cedrol crystals, Cinnamic alcohol, Citronellol, Coranol, Decanol, Dimethyl benzyl carbinol, Dimethyl octanol, Dimethyl phenyl ethyl carbinol, Dimetol, Fenchol, Hexanol, Isoborneol, Isobornyl cyclohexanol, Javanol, Keflorol, Kohinool, Lauryl alcohol, Lilyflore, Linalool oxide, Mayol, Menthol, Norlimbanol, Octanol, Osyrol, Para tertbutylcyclohexanol, Phenoxanol, Phenoxyethanol, Phenyl ethyl alcohol, Phenyl propyl alcohol, Propylene glycol, Rosaphen, Rose glycol, Styrallyl alcohol, Tricyclodecane dimethanol, Tetrahydro linalool, Tetrahydro myrcenol, Timberol, Undecavertol, Cis-3-hexenol, Citronellol laevo, Cyclofloranol, Dihydrolinalool, Dihydromyrcenol, Dimyrcetol, Ebanol, Geraniol, Isopulegol, Linalool, Nerol, Nerolidol, Nonadien-ol trans-2 cis-6, Polysantol, Rosalva, Sandalmysore core, Sandalore, Terpinen-4-ol, Terpineol, Trans-2-hexenol Phenols such as: Butylated hydroxyanisole, Dihydroeugenol, Dimethyl hydroquinone, Dimethyl resorcinol, Eugenol pure, Guaiacol, Isoeugenol, Meta cresol, Methyl diantilis, Para cresol, Propenyl guaethol, Thymol, Ultravanil.

Ethers such as: Ambroxan, Anethole, Anther, Benzyl isoamyl ether, Benzyl isopropyl ether, Benzyl isovalerate, Boisiris, Cedramber, Cetalox, Decyl methyl ether, Dibenzyl ether, Dihydro rose oxide, Diphenyl oxide, Doremox, Estragole, Ethyl linalool, Eucalyptol, Galaxolide, Gyrane, Herbavert, Lime oxide, Madrox, Methyl isoeugenol, Naphthyl isobutyl ether beta, Nerol oxide, Nerolin bromelia, Para cresyl butyl ether, Para cresyl methyl ether, Petiole, Phenyl ethyl methyl ether, Rhubafuran, Rose oxide, Rosyrane, Trisamber, Vetylbois K, Yara yara Acetals such as: Acetal CD, Acetal R, Amberketal, Boisambrene forte, Citrathal, 1,1-Diethoxyethane, Emeraldine, Freshopal, Herboxane, Indoflor, Jacinthaflor, Magnolan, Spirambrene, Viridine, Elintaal, Glycolierral, Karanal, Methyl pamplemousse, Hydrocarbons such as: Bisabolene, Camphene, Carene delta 3, Caryophyllene, Cedrene, Cymene para, Dipentene, Diphenyl methane, Isolongifolene, Limonene d-, Longifolene, Myrcene, Naphthalene, Ocimene, Pinene alpha, Pinene beta, Styrene, Terpinene gamma, Terpinolene, 1,3,5-Undecatriene, Verdoracine.

Sulphur compounds such as: Corps cassis, Dibutyl sulphide, Dimethyl sulphide, Exovert, Grapefruit thiol, Oxane, Ribes mercaptan, Sulfurol, Thiocineol.

Nitriles such as: Cinnamyl nitrile, Citronellyl nitrile, Citronitrile, Clonal, Cumin nitrile, Hexyl cyclopentanone, Irisnitrile, Lemonile, Peonile, Tridecyl nitrile, Agrumen nitrile, n-decyl nitrile.

Oximes such as: Buccoxime, Labienoxime, Stemone.

Nitrogen heterocycles such as: 2-acetylpyrazine, 2-acetylpyridine, sec-butylquinoline, Corps racine, 2-ethyl-3,5(or 6)-dimethylpyrazine, Furfuryl pyrrole, Indole, Isobutyl quinoline, 2-Isobutyl-3(or 6)-methoxypyrazine, Isopropyl quinoline, Maritima, p-methyl quinoline, Skatol, 2,3,5-trimethylpyrazine.

Nitro compound such as: Musk Ketone.

Schiff bases such as: Aurantiol, Helianthral, Ligantraal, Verdantiol.

Other materials such as: Acetanilide, Gardamide, Paradisamide, Dimethyl anthranilate, Methyl anthranilate, n-Butyric acid, Capric acid, Caproic acid, Caprylic acid, Phenylacetic acid, Caryophyllene oxide, Cedroxyde, Tobacarol.

The compounds of formula (X) or of formula (Y) can accordingly be used for the production of compositions and, as will be evident from the foregoing compilation, a wide range of known odorants/fragrance, flavor and/or deodorizing/masking materials. In the production of such compositions, the known fragrance, flavor and/or deodorizing/masking materials referred to earlier can be used according to methods which are known to the perfumer such as, for example, according to W. A. Poucher, Perfumes, Cosmetics and Soaps 2, 7th Edition, Chapman and Hall, London 1974.

In an embodiment of the present invention, the claimed fragrance, flavor and/or deodorizing/masking composition comprises in addition to the compound(s) of formula (X) or of formula (Y) at least one ester and/or one alcohol (other than compound (X) if present), preferably at least a mixture of ester and alcohol; the said ester and/or alcohol are preferably selected from the list defined herein above. In an embodiment of the present invention, the claimed odorant composition is characterised by a total content of the compound(s) of formula (X) or of formula (Y) together with the ester(s) and/or alcohol(s) which is superior to 25 wt %, preferably superior to 50 wt %, for example superior to 75 wt %, or even superior to 90 wt %.

Preparation

Various acids were screened for selective formation of 2,6-diethyl-3,3,4-trimethyltetrahydro-2H-pyran-4-ol (X) by reacting 4,4,5-trimethylhex-5-en-3-ol and propanal. All reactions were performed at room temperature (25° C.) in toluene with 0.5 equivalents of the corresponding acid.

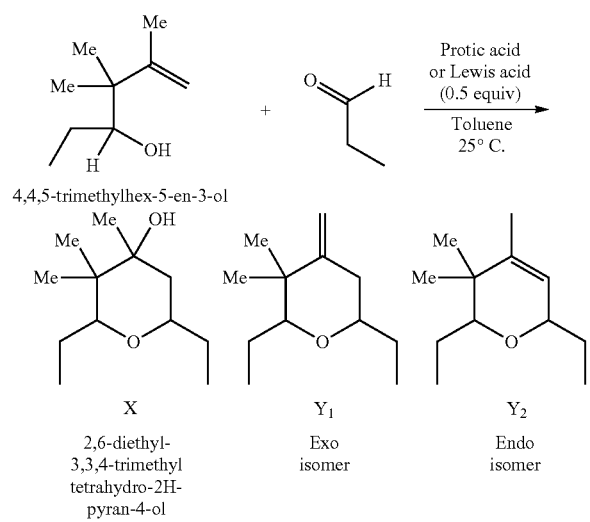

| Acid | Product X (% conversion by GC) | Product Y(Y$_1$ + Y$_2$) (% conversion by GC) |
| --- | --- | --- |
| H$_3$PO$_4$ | 63.12 | 14.02 |
| HCl | 34.66 | 8.88 |
| H$_2$SO$_4$ | 1.22 | 78.95 |
| CH$_3$COOH | 0.19 | 1.96 |
| CF$_3$COOH | 65.75 | 16 |
| CF$_3$SO$_3$H | — | — |
| MSA | 1.86 | 75.21 |
| PTSA | 18.27 | 61.56 |
| BF$_3$-Et$_2$O | 0.00 | 54.24 |
| FeCl$_3$ | 69.89 | 4.72 |
| ZnCl$_2$ | 18.44 | 0.65 |

Clearly, phosphoric acid, trifluoroacetic acid and ferric chloride worked far better in selective formation of the desired tertiary alcohol (X), while the isomeric alkenes (Y$_1$+Y$_2$) were formed to a much lesser extent. On the other hand, all other acids either afforded desired alcohol (X) in poor yields and/or in most cases, isomeric alkenes were formed predominantly.

Trifluoroacetic acid is an expensive and corrosive acid while ferric chloride is harmful and corrosive and potentially very dangerous. Phosphoric acid (H$_3$PO$_4$) is a comparatively weaker acid than trifluoroacetic acid and ferric chloride. Also, phosphoric acid is much less corrosive than trifluoroacetic acid and ferric chloride.

With an aim to obviate use of toluene, various concentrations of phosphoric acid in water were used for the reaction between 4,4,5-trimethylhex-5-en-3-ol and propanal. Surprisingly, it was found that the reaction worked very well and the desired product, 2,6-diethyl-3,3,4-trimethyltetrahydro-2H-pyran-4-ol was formed in good yields. It was found that aqueous phosphoric acid worked well and formed compounds represented by formula (X) in good yields.

In a preferred embodiment according to the present invention, the compounds represented by the general formula (X) can be advantageously synthesized in one step from corresponding alcohols of formula (I) and a carbonyl compound of formula (II) (aldehyde or ketone) in presence of phosphoric acid, preferably of aqueous (preferably 10%-85% by weight) phosphoric acid, more specifically between 30%-60% aqueous phosphoric acid, more specifically between 55%-60% aqueous phosphoric acid (0.1-1.0 equivalents), and at a temperature between 0° C.-45° C. In this case, a small amount of corresponding compound (Y) may also advantageously be formed. Herein, each compound Y is preferably a mixture of exo isomer Y$_1$ and endo isomer Y$_2$.

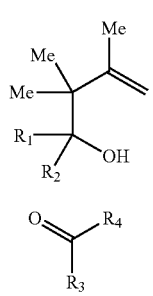

(I)

(II)

wherein, R$_1$, R$_2$, R$_3$ and R$_4$ are defined as hereinabove.

For example, R$_1$ is an alkyl group having up to 6 carbon atoms or an alkenyl group having up to 6 carbon atoms or a phenyl group or a substituted phenyl group.; R$_2$ is H or an alkyl group having up to 6 carbon atoms or an alkenyl group having up to 6 carbon atoms; R$_3$ is an alkyl group having up to 6 carbon atoms or an alkenyl group having up to 6 carbon atoms and R$_4$ is H or an alkyl group having up to 6 carbon atoms or an alkenyl group having up to 6 carbon atoms.

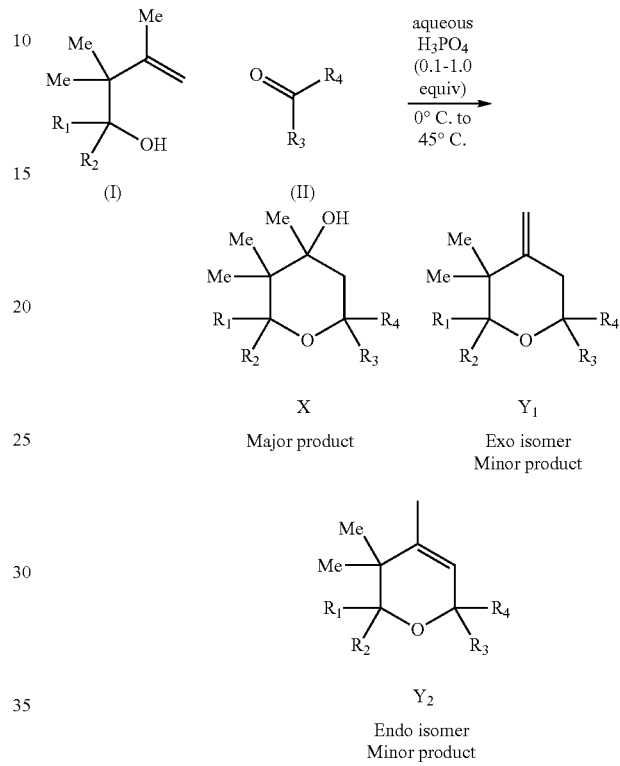

In literature, it is known that the Prince cyclization of a homoallylic alcohol such isoprenol with a carbonyl compound such as an aldehyde or a ketone affords 2,4-disubstituted tetrahydropyran-4-ol. However, there are no examples of Prince reactions of homoallylic alcohols represented by formula (I) with carbonyl compounds. In fact, it may be expected that under acidic conditions, the corresponding secondary or tertiary alcohols represented by formula (I) may undergo dehydration or rearrangement followed by dehydration.

In an embodiment of the present invention, it was surprisingly found that under appropriate concentration (e.g. 55-60%) of aqueous phosphoric acid (0.1-1.0 equivalents), alcohols of formula (I) undergo Prince cyclization with carbonyl compounds at 0° C.-45° C. to afford 2,6-disubstituted-3,3,4-trimethyltetrahydro-2H-pyran-4-ol derivatives (X);

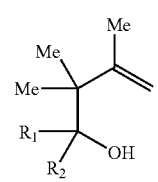

(I)

-continued

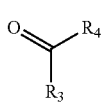
(II)

wherein $R_1$, $R_2$, $R_3$ and $R_4$ are defined as hereinabove.

For example, $R_1$ is an alkyl group having up to 6 carbon atoms or an alkenyl group having up to 6 carbon atoms or a phenyl group or a substituted phenyl group.; $R_2$ is H or an alkyl group having up to 6 carbon atoms or an alkenyl group having up to 6 carbon atoms; $R_3$ is an alkyl group having up to 6 carbon atoms or an alkenyl group having up to 6 carbon atoms and $R_4$ is H or an alkyl group having up to 6 carbon atoms or an alkenyl group having up to 6 carbon atoms.

The radicals $R_1$, $R_2$, $R_3$ and $R_4$ of compound of formula (I) and compound of formula (II) are identical to the radicals $R_1$, $R_2$, $R_3$ and $R_4$ of the corresponding synthesised compound(s) of formula (X) and/or of formula ($Y_1$) and/or of formula ($Y_2$) and/or mixtures thereof.

According to the present invention, radicals $R_1$ and $R_2$ are separated radicals, i.e. they do not form together a ring. According to the present invention, radicals $R_3$ and $R_4$ are separated radicals, i.e. they do not form together a ring.

The compounds represented by the general formula (Y) can be advantageously synthesized in one step from corresponding alcohols (I) and a carbonyl compound (II, aldehyde or ketone) in presence of protic acids such as p-toluenesulfonic acid (0.1-1.0 equivalents) at 25° C.-45° C. in organic solvents such as dichloroethane (EDC). In fact, a typical compound Y is preferably a mixture of exo isomer $Y_1$ and endo isomer $Y_2$. In this case, a small amount of corresponding compound (X) may also be formed, wherein $R_1$, $R_2$, $R_3$ and $R_4$ are defined as hereinabove.

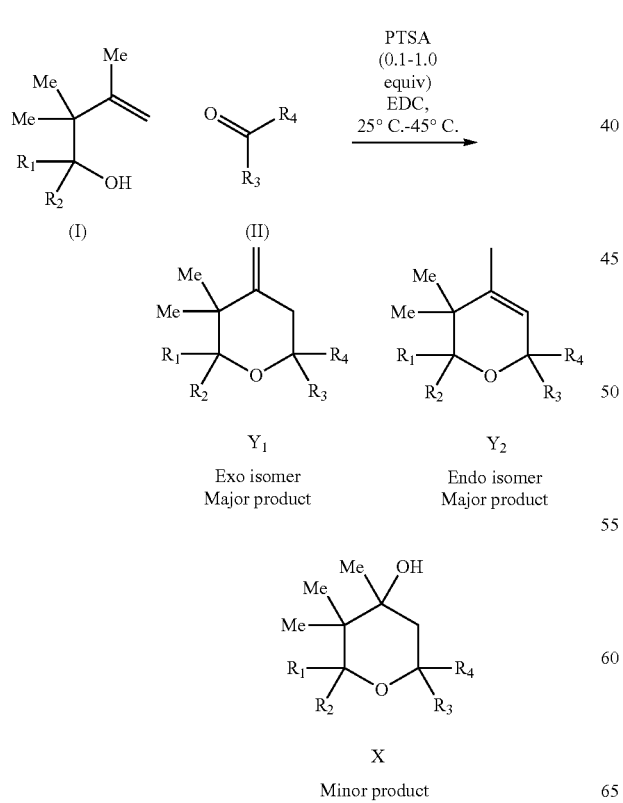

The compounds of the general formula (I) can be synthesized as in WO2019228903.

OR

The compounds of the general formula (I) can be prepared by sodium borohydride-mediated reduction of the corresponding carbonyl compounds of formula (III) or by addition of an appropriate Grignard reagent $R_2MgX$ to (III);

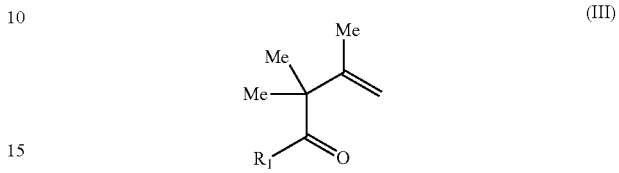
(III)

wherein, $R_1$ is an alkyl group having up to 6 carbon atoms or an alkenyl group having up to 6 carbon atoms or a phenyl group or a substituted phenyl group.; $R_2$ is an alkyl or alkenyl group having up to 6 carbon atoms.

The compounds of the general formula (III) can be prepared from 2,3-dimethylbut-1-ene or 2,3-dimethylbut-2-ene and corresponding anhydride or acid chloride of the carboxylic acid $R_1COOH$ in presence of either any Lewis acid such as $AlCl_3$ or $ZnCl_2$ or a protic acid such as methanesulfonic acid.

Example 1

Synthesis of 2,6-diethyl-3,3,4-trimethyltetrahydro-2H-pyran-4-ol

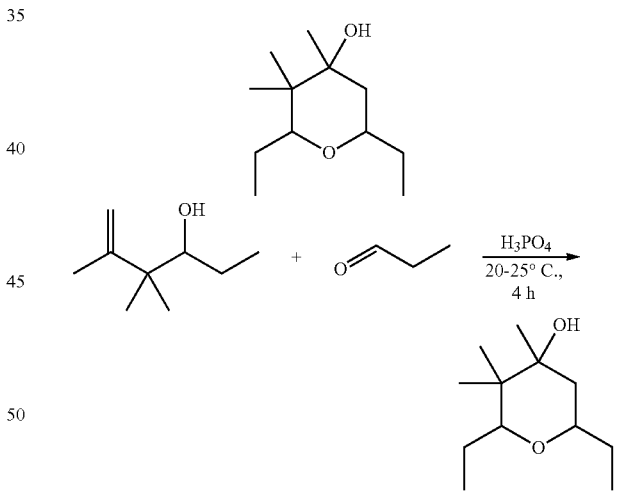

Method A: To a solution of 4,4,5-trimethylhex-5-en-3-ol (250 g, 1.75 mmol) and phosphoric acid (84.1 g of 85% solution, 71.5 g, 0.73 mmol) in water (50 g) at 25° C. was slowly added propionaldehyde (125 g, 2.15 mmol) over 4 h. After stirring the reaction mixture for 2 h at 25° C., it was diluted with water (500 mL) and the aqueous layer was separated. The organic layer was washed with 10% sodium bicarbonate solution (300 mL) followed by water (500 mL). The organic layer was concentrated in vacuo and the resulting crude was subjected to fractional distillation (66° C., 3 mbar) to afford 2,6-diethyl-3,3,4-trimethyltetrahydro-2H-pyran-4-ol (220.0 g, 62%) as mixture of two diastereomers (92:8, colorless liquid).

$^1$H NMR (400 MHz, CDCl$_3$), major diastereomer: δ 3.22-3.28 (m, 1H), 3.01 (dd, J=2.4 Hz, 10.0 Hz, 1H), 1.52-1.61 (m, 1H), 1.41-1.61 (m, 2H), 1.30-1.39 (m, 2H), 1.26 (s, 3H), 0.92-1.01 (m, 10H), 0.81 (s, 3H); $^{13}$C NMR (100 MHz, CDCl$_3$): δ 83.6, 73.3, 43.8, 41.2, 29.2, 23.2, 22.7, 19.2, 15.9, 11.8, 10.2

Odor profile: patchouli-like, fresh, camphoraceous, earthy, woody.

Example 2

Synthesis of 2,3,3,4,6-pentamethyltetrahydro-2H-pyran-4-ol

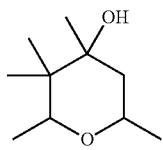

Obtained using method A from 3,3,4-trimethylpent-4-en-2-ol and acetaldehyde $^1$H NMR (400 MHz, CDCl$_3$), mixture of two diastereomers in the ratio 77:23; major diastereomer δ 3.57-3.49 (m, 1H), 3.37 (q, J=6.4 Hz, 1H), 1.61-1.55 (m, 1H), 1.37 (dd, J=12.8, 2.4 Hz, 1H), 1.21 (s, 3H), 1.13 (d, J=4.4 Hz, 3H), 1.03 (d, J=6.4 Hz, 3H), 0.90 (s, 3H), 0.75 (s, 3H)

Odor profile: dry woody, aromatic.

Example 3

Synthesis of 2-isopropyl-3,3,4,6-tetramethyltetrahydro-2H-pyran-4-ol

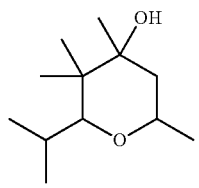

Obtained using method A from 2,4,4,5-tetramethylhex-5-en-3-ol and acetaldehyde

Odor profile: camphoraceous, patchouli-like.

Example 4

Synthesis of 6-ethyl-2-isopropyl-3,3,4-trimethyltetrahydro-2H-pyran-4-ol

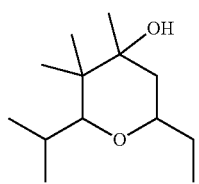

Obtained using method A from 2,4,4,5-tetramethylhex-5-en-3-ol and propionaldehyde Odor profile: camphoraceous, patchouli-like.

Example 5

Synthesis of 6-ethyl-2,3,3,4-tetramethyltetrahydro-2H-pyran-4-ol

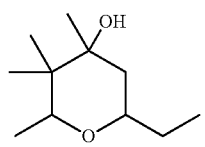

Obtained using method A from 3,3,4-trimethylpent-4-en-2-ol and propionaldehyde

Odor profile: strong woody.

Example 6

Synthesis of 2,3,3,4-tetramethyl-6-propyltetrahydro-2H-pyran-4-ol

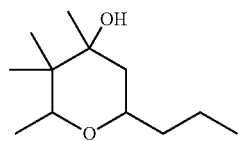

Obtained using method A from 3,3,4-trimethylpent-4-en-2-ol and butyraldehyde $^1$H NMR (400 MHz, CDCl$_3$), mixture of two diastereomers in the ratio 55:45; δ 3.50-3.43 (m, 1H), 3.38-3.31 (m, 2H), 3.09-3.06 (m, 1H), 1.59-1.52 (m, 5H), 1.39-1.33 (m, 3H), 1.32-1.26 (m, 4H), 1.21 (s, 3H), 1.20 (s, 3H), 1.12 (d, J=6.4 Hz, 3H), 1.02 (d, J=6.4 Hz, 3H), 0.89 (s, 3H), 0.88 (s, 3H), 0.84 (t, J=7.2 Hz, 3H), 0.83 (t, J=7.2 Hz, 3H), 0.75 (s, 3H), 0.74 (s, 3H)

Odor profile: woody.

Example 7

Synthesis of 6-isopropyl-2,3,3,4-tetramethyltetrahydro-2H-pyran-4-ol

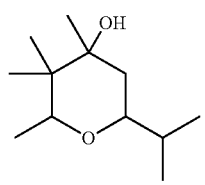

Obtained using method A from 3,3,4-trimethylpent-4-en-2-ol and isobutyraldehyde $^1$H NMR (400 MHz, CDCl$_3$), mixture of two diastereomers in the ratio 60:40; major diastereomer δ 3.48-3.38 (m, 1H), 2.89-2.88 (m, 1H), 1.2 (s, 3H), 1.82-1.74 (m, 1H), 1.62-1.52 (m, 2H), 1.09 (d, J=6.4 Hz, 3H), 0.88-0.86 (overlapped peaks, 6H), 0.8 (s, 6H).

Odor profile: woody.

Example 8

Synthesis of 2-ethyl-2,4,5,5,6-pentamethyltetrahydro-2H-pyran-4-ol

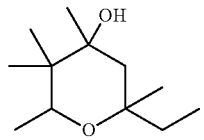

Obtained using method A from 3,3,4-trimethylpent-4-en-2-ol and 2-butanone

Odor profile: woody camphoraceous, aromatic piney.

Example 9

Synthesis of 2-ethyl-3,3,4,6-tetramethyltetrahydro-2H-pyran-4-ol

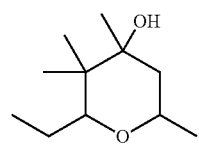

Obtained using method A from 4,4,5-trimethylhex-5-en-3-ol and acetaldehyde $^1$H NMR (400 MHz, CDCl$_3$) δ 3.52-3.40 (m, 1H), 3.0-2.91 (dd, 1H), 1.62-1.54 (m, 1H), 1.40-1.35 (m, 2H), 1.32-1.25 (m, 1H), 1.21 (s, 3H), 1.13 (d, J=6.0 Hz, 3H), 0.91 (t, J=7.2 Hz, 3H), 0.88 (s, 3H), 0.75 (s, 3H).

Odor profile: woody.

Example 10

Synthesis of 2-ethyl-3,3,4-trimethyl-6-propyltetrahydro-2H-pyran-4-ol

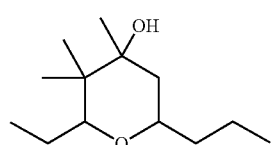

Obtained using method A from 4,4,5-trimethylhex-5-en-3-ol and butyraldehyde

Odor profile: cedar woody note, fruity.

Example 11

Synthesis of 2-ethyl-6-isopropyl-3,3,4-trimethyltetrahydro-2H-pyran-4-ol

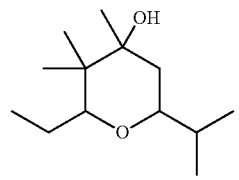

Obtained using method A from 4,4,5-trimethylhex-5-en-3-ol and isobutyraldehyde

Odor profile: woody, camphoraceous

Example 12

Synthesis of 2-ethyl-6-isobutyl-3,3,4-trimethyltetrahydro-2H-pyran-4-ol

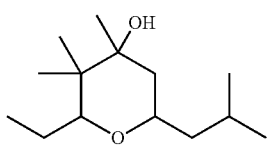 [SMILES: CCC1OC(CC(C)C)CC(C)(O)C1(C)C]

Obtained using method A from 4,4,5-trimethylhex-5-en-3-ol and isovaleraldehyde

Organoleptic profile: green, woody, hay, eucalyptus-like.

Example 13

Synthesis of 6-ethyl-2,2,4,5,5-pentamethyltetrahydro-2H-pyran-4-ol

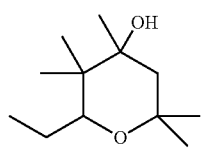

Obtained using method A from 4,4,5-trimethylhex-5-en-3-ol and acetone

Odor profile: woody, bit cresolic.

Example 14

Synthesis of 2,6-diethyl-2,4,5,5-tetramethyltetrahydro-2H-pyran-4-ol

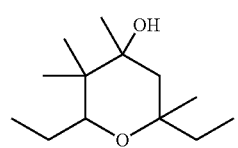

Obtained using method A from 4,4,5-trimethylhex-5-en-3-ol and 2-butanone $^1$H NMR (400 MHz, CDCl$_3$) δ 3.21-3.18 (m, 1H), 3.04-2.95 (m, 1H), 1.59-1.46 (m, 3H), 1.42-1.30 (m, 3H), 1.21 (s, 3H), 0.94-0.87 (overlapped 4 Me signals, 12H), 0.75 (s, 3H).

Odor profile: dry woody.

Example 15

Synthesis of 6-ethyl-3,3,4-trimethyl-2-propyltetrahydro-2H-pyran-4-ol

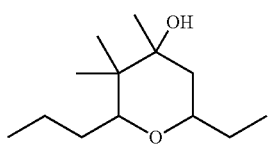

Obtained by method A from 2,3,3-trimethylhept-1-en-4-ol and propionaldehyde as mixture of stereoisomers.

Odor profile: woody.

Example 16

Synthesis of 6-isopropyl-3,3,4-trimethyl-2-propyltetrahydro-2H-pyran-4-ol

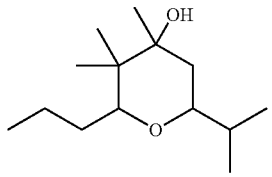 [SMILES: CCCC1OC(C(C)C)CC(C)(O)C1(C)C]

Obtained by method A from 2,3,3-trimethylhept-1-en-4-ol and isobutyraldehyde as a mixture of stereoisomers.

Odor profile: woody.

Example 17

Synthesis of 6-ethyl-2-isobutyl-3,3,4-trimethyltetrahydro-2H-pyran-4-ol

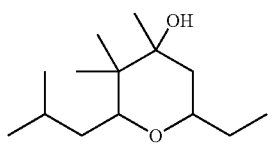 [SMILES: CCC1CC(C)(O)C(C)(C)C(CC(C)C)O1]

Obtained from method A using 2,3,3,6-tetramethylhept-1-en-4-ol and propionaldehyde.

$^1$H NMR (400 MHz, CDCl$_3$) mixture of two diastereomers in the ratio 90:10; major diastereomer δ 3.23-3.16 (m, 1H), 3.13 (dd, J=10.4, 1.6 Hz, 1H), 2.95 (dd, J=10.4, 2.4 Hz, 1H), Odor profile: woody.

Example 18

Synthesis of 2-(2,3-dimethylbut-3-en-2-yl)-2,4,5,5,6-pentamethyltetrahydro-2H-pyran-4-ol

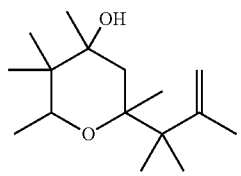 [SMILES: C=C(C)C(C)(C)C1(C)CC(C)(O)C(C)(C)C(C)O1]

Obtained using method A from 3,3,4-trimethylpent-4-en-2-ol and 3,3,4-trimethylpent-4-en-2-one Organoleptic profile: camphoraceous, aromatic.

Example 19

Synthesis of 2-(2,3-dimethylbut-3-en-2-yl)-2-ethyl-4,5,5,6-tetramethyltetrahydro-2H-pyran-4-ol

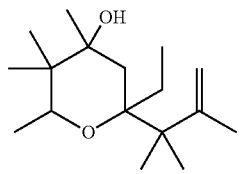 [SMILES: C=C(C)C(C)(C)C1(CC)CC(C)(O)C(C)(C)C(C)O1]

Obtained using method A from 3,3,4-trimethylpent-4-en-2-ol and 4,4,5-trimethylhex-5-en-3-one Organoleptic profile: woody, aromatic.

Example 20

Synthesis of 2,3,3-trimethyl-4-methylene-6-propyltetrahydro-2H-pyran and 2,3,3,4-tetramethyl-6-propyl-3,6-dihydro-2H-pyran

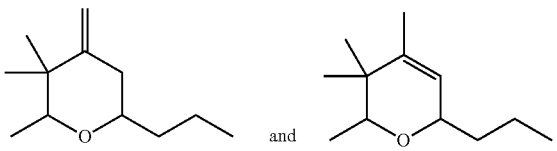

Method B: To a solution of 3,3,4-trimethylpent-4-en-2-ol (10 g, 38 mmol), and p-toluenesulfonic acid monohydrate (2.97 g, 15.60 mmol) in 1,2-dicloroethane (100 mL) was added butyraldehyde (6.75 g, 94 mmol) drop wise over 1 h. The resulting reaction mixture was stirred at room temperature for 2 h and then it was diluted with water, neutralized by addition of saturated NaHCO$_3$ and extracted with dichloromethane (3×50 mL). The organic layer was washed with water, brine, dried over anhydrous Na$_2$SO$_4$ and filtered. The organic solvent was removed under reduced pressure to afford a crude compound which was purified by column chromatography (230-400 mesh silica gel) using 0-20% ethyl acetate/hexane to afford 4.2 g alkene (Example 29) and 4.8 g of alcohol (Example 4). Both the products were distilled using Kugelrohr apparatus to afford respective samples for olfactory evaluation (combined yield 63%).

Odor profile: woody.

Example 21

Synthesis of 6-ethyl-2,3,3-trimethyl-4-methylenetetrahydro-2H-pyran and 6-ethyl-2,3,3,4-tetramethyl-3,6-dihydro-2H-pyran Obtained using method B from 3,3,4-trimethylpent-4-en-2-ol and propionaldehyde as a mixture of diastereomers and exo/endo isomers.

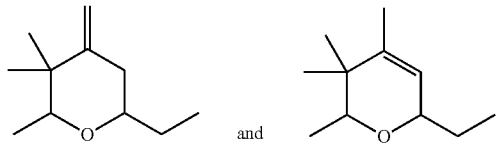

Odor profile: woody, camphoraceous

Example 22

Synthesis of 2,3,3,6-tetramethyl-4-methylenetetrahydro-2H-pyran and 2,3,3,4,6-pentamethyl-3,6-dihydro-2H-pyran

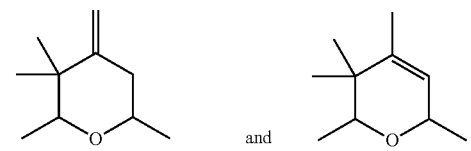

Obtained using method B from 3,3,4-trimethylpent-4-en-2-ol and acetaldehyde as a mixture of diastereomers and exo/endo isomers.

$^1$H NMR (400 MHz, CDCl$_3$)

Odor profile: mossy, woody, sweet pea note.

Example 23

Synthesis of 6-isopropyl-2,3,3-trimethyl-4-methylenetetrahydro-2H-pyran and 6-isopropyl-2,3,3,4-tetramethyl-3,6-dihydro-2H-pyran Obtained using method B from 3,3,4-trimethylpent-4-en-2-ol and isobutyraldehyde as a mixture of diastereomers and exo/endo isomers.

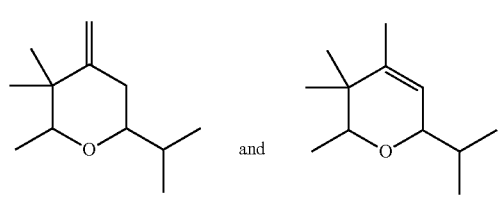

Odor profile: woody camphoraceous

Example 24

Synthesis of 6-isobutyl-2,3,3-trimethyl-4-methylenetetrahydro-2H-pyran and 6-isobutyl-2,3,3,4-tetramethyl-3,6-dihydro-2H-pyran Obtained using method B from 3,3,4-trimethylpent-4-en-2-ol and isovaleraldehyde as a mixture of diastereomers and exo/endo isomers.

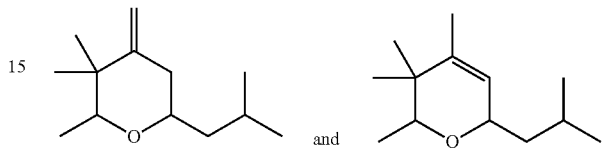

Odor profile: woody.

Example 25

Synthesis of 6-butyl-2,3,3-trimethyl-4-methylenetetrahydro-2H-pyran and 6-butyl-2,3,3,4-tetramethyl-3,6-dihydro-2H-pyran Obtained using method B from 3,3,4-trimethylpent-4-en-2-ol and butyraldehyde as a mixture of diastereomers and exo/endo isomers.

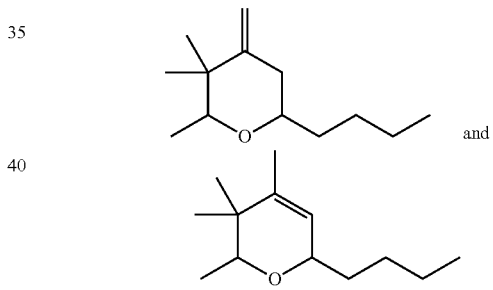

Odor profile: woody.

Example 26

Synthesis of 2-ethyl-3,3,6-trimethyl-4-methylenetetrahydro-2H-pyran and 2-ethyl-3,3,4,6-tetramethyl-3,6-dihydro-2H-pyran

Obtained using method B from 4,4,5-trimethylhex-5-en-3-ol and acetaldehyde as a mixture of diastereomers and exo/endo isomers.

Odor profile: camphoraceous, woody.

Example 27

Synthesis of 2,6-diethyl-3,3-dimethyl-4-methyl-enetetrahydro-2H-pyran and 2,6-diethyl-3,3,4-trimethyl-3,6-dihydro-2H-pyran

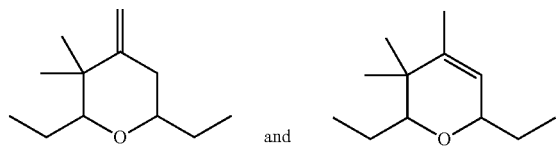

Obtained using method B from 4,4,5-trimethylhex-5-en-3-ol and propionaldehyde as a mixture of diastereomers and exo/endo isomers.

Odor profile: woody, camphoraceous

Example 28

Synthesis of 2-ethyl-3,3-dimethyl-4-methylene-6-propyltetrahydro-2H-pyran and 2-ethyl-3,3,4-trimethyl-6-propyl-3,6-dihydro-2H-pyran

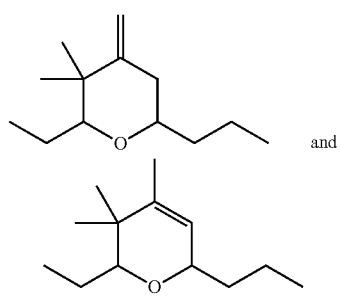

Obtained using method B from 4,4,5-trimethylhex-5-en-3-ol and butyraldehyde as a mixture of diastereomers and exo/endo isomers.

Odor profile: woody powdery, gourmand, caramel, licorice, estragon, jasmonic,

Example 29

Synthesis of 6-butyl-2-ethyl-3,3-dimethyl-4-methyl-enetetrahydro-2H-pyran and 6-butyl-2-ethyl-3,3,4-trimethyl-3,6-dihydro-2H-pyran Obtained using method B from 4,4,5-trimethylhex-5-en-3-ol and valeraldehyde as a mixture of diastereomers and exo/endo isomers.

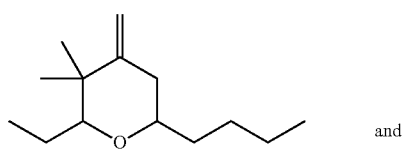

-continued

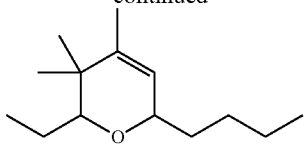

Odor profile: woody, aldehyde, green, like raw sugar cane, floral, Tea, tobacco, fenugreek.

Example 30

Synthesis of 6-ethyl-3,3-dimethyl-4-methylene-2-propyltetrahydro-2H-pyran and 6-ethyl-3,3,4-trimethyl-2-propyl-3,6-dihydro-2H-pyran

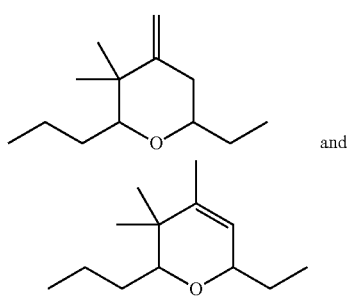

Obtained using method B from 2,3,3-trimethylhept-1-en-4-ol and propionaldehyde as a mixture of diastereomers and exo/endo isomers.

Odor profile: woody.

Example 31

Synthesis of 2-ethyl-6-(4-methoxyphenyl)-3,3-dimethyl-4-methylenetetrahydro-2H-pyran and 2-ethyl-6-(4-methoxyphenyl)-3,3,4-trimethyl-3,6-dihydro-2H-pyran

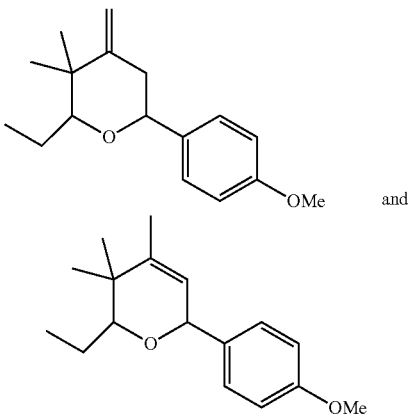

Obtained using method B from 4,4,5-trimethylhex-5-en-3-ol and 4-methoxybenzaldehyde as a mixture of diastereomers and exo/endo isomers.

Odor profile: woody, powdery, floral, anisic.

Composition Evaluation Example

In the following invention, various woody composition accords containing varied benchmarking compounds were evaluated and compared against a composition accord contaning the compound from example 1. Composition A contains compound from example 1, viz 2,6-diethyl-3,3,4-trimethyltetrahydro-2H-pyran-4-ol as 10% w/w solution in IPM (Isopropyl myristate). Composition B contains commercial compound Clearwood, composition C contains commercial compound PTBC Ketone, composition D contains commercial compound OTBC Ketone; and finally, composition E contains only IPM and serves as blank.

All above compositions were used in shampoo as well as in fabric softener.

| | Examples | | | | |
|---|---|---|---|---|---|
| | A | B | C | D | E |
| Raw Materials (parts by weight) | | | | | |
| Kambernoir SHK | 10 | 10 | 10 | 10 | 10 |
| Bacdanol | 8 | 8 | 8 | 8 | 8 |
| Cedryl methyl ketone | 8 | 8 | 8 | 8 | 8 |
| Eugenyl acetate | 0.5 | 0.5 | 0.5 | 0.5 | 0.5 |
| Iso E Super | 40 | 40 | 40 | 40 | 40 |
| Isobornyl acetate | 10 | 10 | 10 | 10 | 10 |
| Iso bornyl cyclo hexenol (IBCH) | 8 | 8 | 8 | 8 | 8 |
| p-Tertiary butyl cyclohexyl acetate (PTBCA) | 10 | 10 | 10 | 10 | 10 |
| 2,6-diethyl-3,3,4-trimethyltetrahydro-2H-pyran-4-ol as 10% w/w solution in IPM | 5.5 | 0 | 0 | 0 | 0 |
| Clearwood 1% in IPM | 0 | 5.5 | 0 | 0 | 0 |
| PTBC Ketone | 0 | 0 | 5.5 | 0 | 0 |
| OTBC Ketone | 0 | 0 | 0 | 5.5 | 0 |
| IPM | 0 | 0 | 0 | 0 | 5.5 |
| Total | 100 | 100 | 100 | 100 | 100 |

Clearly, the introduction of 5.5% weight by weight of 2,6-diethyl-3,3,4-trimethyltetrahydro-2H-pyran-4-ol as 10% w/w solution in IPM gives strong woody, patchouli like-effects. It gives a more rounded feel when used in shampoo and gives heaviness to the blend. On the other hand, when Clearwood 1% weight by weight in IPM is used in the above accord, only a soft woody effect is observed. Use of PTBC ketone presents camphoraceous and woody effects whereas OTBC ketone composition imparts a minty and woody character to the blend.

The invention claimed is:

1. Compound(s) of formula (X) and/or of formula ($Y_1$) and/or of formula ($Y_2$)

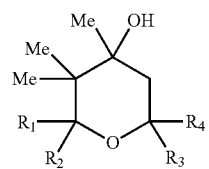

X

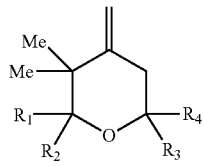

$Y_1$

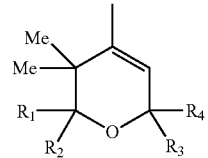

$Y_2$ wherein $R_1$ is an alkyl group having up to 6 carbon atoms or an alkenyl group having up to 6 carbon atoms or a phenyl group or a substituted phenyl group; $R_2$ is H or an alkyl group having up to 6 carbon atoms or an alkenyl group having up to 6 carbon atoms; $R_3$ is an alkyl group having up to 6 carbon atoms or an alkenyl group having up to 6 carbon atoms or a phenyl group or a substituted phenyl group and $R_4$ is H or an alkyl group having up to 6 carbon atoms or an alkenyl group having up to 6 carbon atoms, with the proviso that (X) can't be 3,3,4-trimethyl-2,6-diphenyltetrahydro-2H-pyran-4-ol.

2. Compound(s) according to claim 1 wherein:

$R_1$ is methyl, ethyl, n-propyl, i-propyl, n-butyl, s-butyl, t-butyl, i-butyl, n-pentyl, 2-pentyl, 3-pentyl, n-hexyl, 2-hexyl, 3-hexyl, vinyl, 1-propenyl, prop-1-en-2-yl, allyl, 1-butenyl, 2-butenyl, but-3-en-2-yl, 1-pentenyl, pent-2-en-1-yl, pent-3-en-1-yl, pent-4-en-1-yl, pent-1-en-2-yl, 2-pentenyl, pent-3-en-2-yl, pent-4-en-2-yl, pent-2-en-3-yl, pent-1-en-3-yl, 1-hexenyl, hex-2-en-1-yl, hex-3-en-1-yl, hex-4-en-1-yl, hex-5-en-1-yl, hex-1-en-2-yl, 2-hexenyl, hex-3-en-2-yl, hex-4-en-2-yl, hex-5-en-2-yl, 3-hexenyl, hex-1-en-3-yl, hex-2-en-3-yl, hex-3-en-3-yl, hex-4-en-3-yl, or hex-5-en-3-yl, a phenyl group or a substituted phenyl group;

$R_2$ is H, methyl, ethyl, n-propyl, i-propyl, n-butyl, s-butyl, t-butyl, i-butyl, n-pentyl, 2-pentyl, 3-pentyl, n-hexyl, 2-hexyl, 3-hexyl, vinyl, 1-propenyl, prop-1-en-2-yl, allyl, 1-butenyl, 2-butenyl, but-3-en-2-yl, 1-pentenyl, pent-2-en-1-yl, pent-3-en-1-yl, pent-4-en-1-yl, pent-1-en-2-yl, 2-pentenyl, pent-3-en-2-yl, pent-4-en-2-yl, pent-2-en-3-yl, pent-1-en-3-yl, 1-hexenyl, hex-2-en-1-yl, hex-3-en-1-yl, hex-4-en-1-yl, hex-5-en-1-yl, hex-1-en-2-yl, 2-hexenyl, hex-3-en-2-yl, hex-4-en-2-yl, hex-5-en-2-yl, 3-hexenyl, hex-1-en-3-yl, hex-2-en-3-yl, hex-3-en-3-yl, hex-4-en-3-yl, or hex-5-en-3-yl;

$R_3$ is methyl, ethyl, n-propyl, i-propyl, n-butyl, s-butyl, t-butyl, i-butyl, n-pentyl, 2-pentyl, 3-pentyl, n-hexyl, 2-hexyl, 3-hexyl, vinyl, 1-propenyl, prop-1-en-2-yl, allyl, 1-butenyl, 2-butenyl, but-3-en-2-yl, 1-pentenyl, pent-2-en-1-yl, pent-3-en-1-yl, pent-4-en-1-yl, pent-1-en-2-yl, 2-pentenyl, pent-3-en-2-yl, pent-4-en-2-yl, pent-2-en-3-yl, pent-1-en-3-yl, 1-hexenyl, hex-2-en-1-yl, hex-3-en-1-yl, hex-4-en-1-yl, hex-5-en-1-yl, hex-1-en-2-yl, 2-hexenyl, hex-3-en-2-yl, hex-4-en-2-yl, hex-5-en-2-yl, 3-hexenyl, hex-1-en-3-yl, hex-2-en-3-yl, hex-3-en-3-yl, hex-4-en-3-yl, or hex-5-en-3-yl, a phenyl group or a substituted phenyl group; and $R_4$ is H, methyl, ethyl, n-propyl, i-propyl, n-butyl, s-butyl, t-butyl, i-butyl, n-pentyl, 2-pentyl, 3-pentyl, n-hexyl, 2-hexyl, 3-hexyl, vinyl, 1-propenyl, prop-1-en-2-yl, allyl, 1-butenyl, 2-butenyl, but-3-en-2-yl, 1-pentenyl, pent-2-en-1-yl, pent-3-en-1-yl, pent-4-en-1-yl, pent-1-en-2-yl, 2-pentenyl, pent-3-en-2-yl, pent-4-en-2-yl, pent-2-en-3-yl, pent-1-en-3-yl, 1-hexenyl, hex-2-en-1-yl, hex-3-en-1-yl, hex-4-en-1-yl, hex-5-en-1-yl, hex-1-en-2-yl, 2-hexenyl, hex-3-en-2-yl, hex-4-en-2-yl, hex- 5-en-2-yl, 3-hexenyl, hex-1-en-3-yl, hex-2-en-3-yl, hex-3-en-3-yl, hex-4-en-3-yl, or hex-5-en-3-yl.

3. Compound of formula (X) according to claim 1 and selected from:
2,6-Diethyl-3,3,4-trimethyltetrahydro-2H-pyran-4-ol;
2,3,3,4,6-Pentamethyltetrahydro-2H-pyran-4-ol;
2-isopropyl-3,3,4,6-tetramethyltetrahydro-2H-pyran-4-ol;
6-ethyl-2-isopropyl-3,3,4-trimethyltetrahydro-2H-pyran-4-ol;
6-Ethyl-2,3,3,4-tetramethyltetrahydro-2H-pyran-4-ol;
2,3,3,4-Tetramethyl-6-propyltetrahydro-2H-pyran-4-ol;
6-Isopropyl-2,3,3,4-tetramethyltetrahydro-2H-pyran-4-ol;
2-Ethyl-2,4,5,5,6-pentamethyltetrahydro-2H-pyran-4-ol;
2-Ethyl-3,3,4,6-tetramethyltetrahydro-2H-pyran-4-ol;
2-Ethyl-3,3,4-trimethyl-6-propyltetrahydro-2H-pyran-4-ol;
2-Ethyl-6-isopropyl-3,3,4-trimethyltetrahydro-2H-pyran-4-ol;
2-Ethyl-6-isobutyl-3,3,4-trimethyltetrahydro-2H-pyran-4-ol;
6-Ethyl-2,2,4,5,5-pentamethyltetrahydro-2H-pyran-4-ol;
2,6-Diethyl-2,4,5,5-tetramethyltetrahydro-2H-pyran-4-ol;
6-Ethyl-3,3,4-trimethyl-2-propyltetrahydro-2H-pyran-4-ol;
6-Isopropyl-3,3,4-trimethyl-2-propyltetrahydro-2H-pyran-4-ol;
6-Ethyl-2-isobutyl-3,3,4-trimethyltetrahydro-2H-pyran-4-ol;
2-(2,3-Dimethylbut-3-en-2-yl)-2,4,5,5,6-pentamethyltetrahydro-2H-pyran-4-ol; and
2-(2,3-Dimethylbut-3-en-2-yl)-2-ethyl-4,5,5,6-tetramethyltetrahydro-2H-pyran-4-ol.

4. Compound(s) of formula $(Y_1)$ or $(Y_2)$ according to claim 1 and selected from:
2,3,3-Trimethyl-4-methylene-6-propyltetrahydro-2H-pyran or 2,3,3,4-tetramethyl-6-propyl-3,6-dihydro-2H-pyran, or a mixture thereof,
6-ethyl-2,3,3-trimethyl-4-methylenetetrahydro-2H-pyran and 6-ethyl-2,3,3,4-tetramethyl-3,6-dihydro-2H-pyran, or a mixture thereof,
2,3,3,6-tetramethyl-4-methylenetetrahydro-2H-pyran and 2,3,3,4,6-pentamethyl-3,6-dihydro-2H-pyran, or a mixture thereof,
6-Isopropyl-2,3,3-trimethyl-4-methylenetetrahydro-2H-pyran or 6-isopropyl-2,3,3,4-tetramethyl-3,6-dihydro-2H-pyran, or a mixture thereof,
6-Isobutyl-2,3,3-trimethyl-4-methylenetetrahydro-2H-pyran or 6-isobutyl-2,3,3,4-tetramethyl-3,6-dihydro-2H-pyran, or a mixture thereof,
6-Butyl-2,3,3-trimethyl-4-methylenetetrahydro-2H-pyran or 6-butyl-2,3,3,4-tetramethyl-3,6-dihydro-2H-pyran, or a mixture thereof,
2-Ethyl-3,3,6-trimethyl-4-methylenetetrahydro-2H-pyran or 2-ethyl-3,3,4,6-tetramethyl-3,6-dihydro-2H-pyran, or a mixture thereof,
2,6-diethyl-3,3-dimethyl-4-methylenetetrahydro-2H-pyran and 2,6-diethyl-3,3,4-trimethyl-3,6-dihydro-2H-pyran, or a mixture thereof,
2-ethyl-3,3-dimethyl-4-methylene-6-propyltetrahydro-2H-pyran and 2-ethyl-3,3,4-trimethyl-6-propyl-3,6-dihydro-2H-pyran, or a mixture thereof,
6-Butyl-2-ethyl-3,3-dimethyl-4-methylenetetrahydro-2H-pyran or 6-butyl-2-ethyl-3,3,4-trimethyl-3,6-dihydro-2H-pyran, or a mixture thereof,
6-Ethyl-3,3-dimethyl-4-methylene-2-propyltetrahydro-2H-pyran or 6-ethyl-3,3,4-trimethyl-2-propyl-3,6-dihydro-2H-pyran, or a mixture thereof, or
2-Ethyl-6-(4-methoxyphenyl)-3,3-dimethyl-4-methylenetetrahydro-2H-pyran or 2-ethyl-6-(4-methoxyphenyl)-3,3,4-trimethyl-3,6-dihydro-2H-pyran, or a mixture thereof.

5. Compound according to claim 1 wherein $R_1$ is an alkyl group having up to 6 carbon atoms or an alkenyl group having up to 6 carbon atoms; $R_2$ is H or an alkyl group having up to 6 carbon atoms or an alkenyl group having up to 6 carbon atoms; $R_3$ is an alkyl group having up to 6 carbon atoms or an alkenyl group having up to 6 carbon atoms and $R_4$ is H or an alkyl group having up to 6 carbon atoms or an alkenyl group having up to 6 carbon atoms.

6. Compound according to claim 1 wherein $R_1$ is an alkyl group having up to 6 carbon atoms; $R_2$ is H or an alkyl group having up to 6 carbon atoms; $R_3$ is an alkyl group having up to 6 carbon atoms or an alkenyl group having up to 6 carbon atoms and $R_4$ is H or an alkyl group having up to 6 carbon atoms or an alkenyl group having up to 6 carbon atoms.

7. Mixture of compounds of formula (X) and of formula $(Y_1)$ according to claim 1.

8. Mixture of compounds of formula (X) and of formula $(Y_2)$ according to claim 1.

9. Mixture of compounds of formula $(Y_1)$ and of formula $(Y_2)$ according to claim 1.

10. Mixture of compounds of formula (X) and of formula $(Y_1)$ and of formula $(Y_2)$ according to claim 1.

11. Fragrance, flavor and/or deodorizing/masking compositions comprising compound(s) or a mixture of compounds according to claim 1.

12. Fragrance, flavor and/or deodorizing/masking compositions comprising compound(s) or a mixture of compounds according to claim 1 wherein the content of the compounds of formula (X) and/or of formula $(Y_1)$ and/or of formula $(Y_2)$ are comprised between 0.0001 and 95 wt %.

13. Fragrance, flavor and/or deodorizing/masking compositions comprising compound(s) or a mixture of compounds according to claim 1 additionally comprising at least one ester and/or one alcohol, the alcohol being different than compound (X) if present.

14. Fragrance, flavor and/or deodorizing/masking compositions according to claim 13 wherein the content of the compounds of formula (X) and/or of formula $(Y_1)$ and/or of formula $(Y_2)$ together with the ester(s) and/or alcohol(s) is superior to 25 wt %.

15. Process for preparing compound(s) of formula (X) and/or of formula $(Y_1)$ and/or of formula $(Y_2)$ according to claim 1 and/or mixtures thereof, wherein a compound of formula (I) is reacted with a compound of formula (II) with radicals $R_1$, $R_2$, $R_3$ and $R_4$ defined as in claim 1

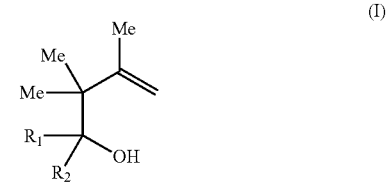

-continued

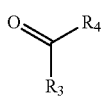
(II)

in the presence of either
a phosphoric acid, or
a protic acid
to form said compound(s) of formula (X) and/or of formula ($Y_1$) and/or of formula ($Y_2$) according to claim 1 and/or mixtures thereof with radicals $R_1$, $R_2$, $R_3$ and $R_4$ of compound of formula (I) and compound of formula (II) being identical to radicals $R_1$, $R_2$, $R_3$ and $R_4$ of said compound(s) of formula (X) and/or of formula ($Y_1$) and/or of formula ($Y_2$) and/or mixtures thereof.

16. Process for preparing compound(s) of formula (X) according to claim 15 wherein the reaction is performed in the presence of aqueous phosphoric acid which has a content of phosphoric acid by weight of 30% to 60%.

17. Process for preparing compound(s) of formula ($Y_1$) and/or of formula ($Y_2$) according to claim 15 wherein the reaction is performed in the presence of a p-toluenesulfonic acid as protic acid and in an organic solvent.

18. Fragrance, flavor and/or deodorizing/masking compositions comprising compound(s) or a mixture of compounds according to claim 1 additionally comprising a mixture of an ester and an alcohol, the alcohol being different than compound (X) if present.

19. Fragrance, flavor and/or deodorizing/masking compositions according to claim 13 wherein the content of the compounds of formula (X) and/or of formula ($Y_1$) and/or of formula ($Y_2$) together with the ester(s) and/or alcohol(s) is superior to 75 wt %.

20. Process for preparing compound(s) of formula ($Y_1$) and/or of formula ($Y_2$) according to claim 15 wherein the reaction is performed in the presence of a p-toluenesulfonic acid as protic acid and in dichloroethane.

* * * * *